United States Patent

[11] 3,563,527

| [72] | Inventor | Alfred Tillman |
| | | Mt. Tabor, N.J. |
| [21] | Appl. No. | 808,790 |
| [22] | Filed | Mar. 20, 1969 |
| [45] | Patented | Feb. 16, 1971 |
| [73] | Assignee | Marotta Valve Corporation |
| | | Boonton, N.J. |

[54] SPRING ASSEMBLY
11 Claims, 5 Drawing Figs.

[52] U.S. Cl. .................................................. 267/181, 267/161
[51] Int. Cl. ...................................................... F16f 1/34
[50] Field of Search .......................................... 267/1 (81), 1 (61), 1 (63)

[56] References Cited
UNITED STATES PATENTS

| 3,888,258 | 5/1959 | Hoffstrom | 267/1 (81) |
| 3,261,598 | 7/1966 | Jones | 267/1 (61) |

*Primary Examiner*—James B. Marbert
*Attorney*—Sandoe, Hopgood & Calimafde

ABSTRACT: A spring assembly having an annular disc of spring material connected at its inner and outer edges to cylindrical elements that connect the disk between the parts with which the spring is to function. The cylindrical elements are constructed with cutouts that divide the elements into secondary spring elements which are angularly spaced around the edges of the disk and which bend to give the assembly a low hysteresis.

PATENTED FEB 16 1971 3,563,527
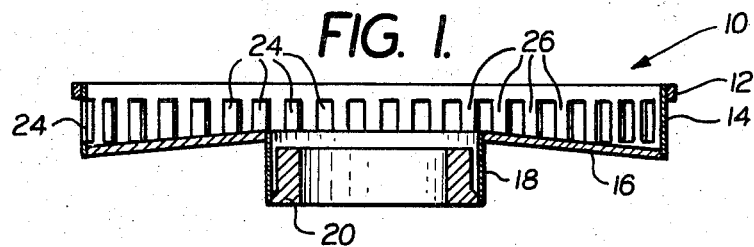
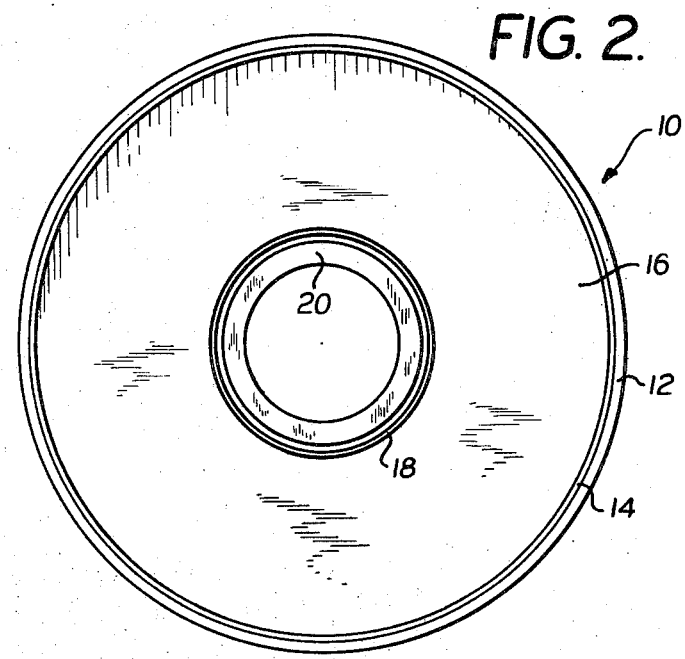
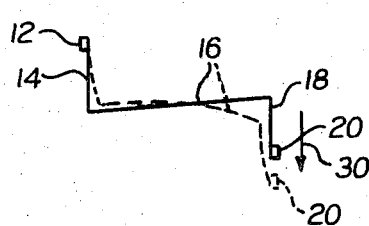
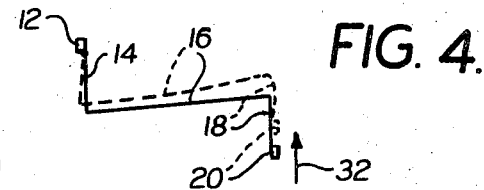
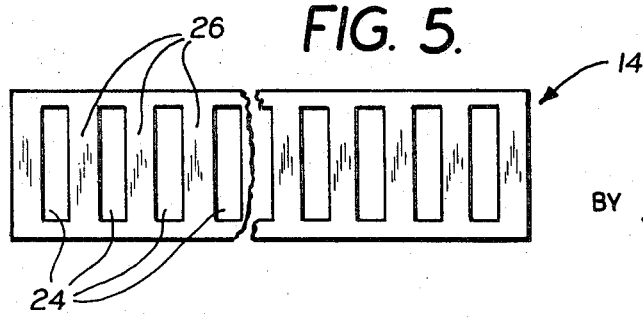
INVENTOR
Alfred Tillman
BY
Sandoe, Hopgood,
& Calimafde
ATTORNEYS.

3,563,527

SPRING ASSEMBLY

SUMMARY OF THE INVENTION

The purpose of this invention is to provide an improved spring assembly for pressure regulators, relief valves, pressure switches, and other transducers. The improved spring assembly has substantially no pressure differential such as is encountered in conventional constructions as the result of sliding friction and hysteresis losses.

The invention supports a spring washer on both its inside and outside edges from legs or secondary springs that bend to avoid sliding friction. These secondary springs are angularly spaced from one another around the axis of the assembly.

The preferred construction for the secondary springs is made by punching elongated openings through metal strips and the metal sections left between the openings constitute the secondary springs when the strip is bent to a cylindrical shape with the long dimensions of the openings extending parallel to the axis of the cylinder. The edges of the strips that connect with the support and with the reference device are preferably welded to the support and reference device.

The spring washer which is the dominant spring element in the preferred construction can flex with no sliding friction and with a minimum of hysteresis. When relatively light metal is used for the secondary springs the hysteresis of the bending secondary springs is too small to measure.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views;

FIG. 1 is a sectional view through a spring assembly made in accordance with this invention;

FIG. 2 is a top plan view of the construction shown in FIG. 2;

FIGS. 3 and 4 are diagrams illustrating the principle of operation of the invention; and FIG. 5 is a greatly enlarged fragmentary view showing one of the strips which is to be bent to cylindrical formation to provide the circle of secondary springs.

DESCRIPTION OF THE PREFERRED EMBODIMENT

FIG. 1 shows a spring assembly 10 having an outer and relatively fixed support ring 12 connected to the upper end of a spring strip 14, preferably by welding. The lower end of the spring strip 14 is secured to the outer circumferential edge of an annular disc or spring washer 16.

The inner circumferential edge of the washer 16 is connected with another spring strip 18 at the upper edge of the spring strip 18. Thus, the spring strips 14 and 18, which are both cylindrical and coaxial with the axis of the washer 16, extend in opposite directions from the washer 16. Both of the strips 14 and 18 are rigidly connected with the washer 16, preferably by welding. The strips 14 and 18 are preferably of a thickness of .002 to .050 inches.

The lower edge of the strip 18 is welded or otherwise rigidly connected with an inner ring 20 which is part of the reference device with which the spring assembly is used. This reference device 20 moves parallel to the axis of the washer 16 and the cylindrical spring strips 14 and 18; and its movement is resisted by the spring action of the washer 16 and the strips 14 and 18 in a manner which will be explained in connection with FIGS. 3 and 4.

Each of the spring strips 14 and 18 has a plurality of openings 24 punched through it, as is best shown in FIG. 5. These openings 24 are preferably elongated in the direction of the width of the strip and they are preferably rectangular so that the metal left between the openings 24 forms secondary springs 26 of uniform cross section. It is not essential that the openings 24 be rectangular or that the secondary springs 26 be of the same width throughout their full height but more desirable action is obtained if they are so constructed.

The strip 14 is shown in FIG. 6 as a flat strip and it is manufactured in this way and then bent to the cylindrical shape necessary for connection with the ring 12 (FIG. 1) and spring disc 16. The strip 14 is made with a length equal to the inside circumference of the ring 12 and the outside circumference of the washer 16 so that when bent to a cylindrical shape, the ends of the strip 14 abut with one another and can be bonded together to make a continuous structure around the full circumference of the spring assembly.

The spring strip 18 is preferably constructed in the same way as the spring strip 14, but the length of the strip is, of course, shorter because of the lesser diameter of the inner circumferential edge of the disc 16. The ring of the reference device 20 has its lower end secured to the bottom edge of the strip 17 18 but is shaped to provide clearance from the spring strip 18 above the bottom edge of the strip. This clearance is for the purpose of permitting the secondary springs 26 of the spring strip 18 to flex inwardly when the spring assembly is in operation. The clearance provided depends upon the degree of flexing for which the spring assembly is designed.

FIG. 3 is a diagram showing the ring 12, strip 14, washer 16, strip 18 and the connected portion of the reference device 20 in full lines. FIG. 3 also shows, in dotted lines, the operation of the spring assembly when the reference device 20 moves downwardly in the direction indicated by the arrow 30. The motion illustrated is out of proportion to the actual motion for which the spring assembly is designed and this exaggeration is introduced into the drawing in order to illustrate more clearly the directions in which the washer dishes and the spring strips 14 and 18 bend in response to the movement of the reference device. The supporting ring 12 remains stationary and the other parts move into the dotted line positions shown in FIG. 3.

FIG. 4 shows the corresponding operation of the apparatus when the reference device 20 moves upward in the direction indicated by the arrow 32. The flecture of the washer 16 and the secondary spring of the strips 14 and 18 are shown in dotted lines.

Both FIGS. 3 and 4 presuppose a disc or washer 16 which is flexible enough to dish or change its degree of dish when the spring assembly operates. In the preferred construction most of the spring action is provided by the dishing of the disc 16, but if desired, the stiffeners of the disc can be correlated with that of the strips so that the strips are the main spring elements.

The washer 16 is shown with uniform thickness throughout its radius. Washers with tapered cross section, preferably those which become thinner toward their inner edges, can be used with this invention where it is desirable to obtain a spring rate different from that obtained with a washer of uniform section.

In the construction illustrated, the openings between the secondary springs are preferably of a width equal to only one-half of the secondary springs. This obtains individual bending action of the secondary springs and still retains most of the metal of the strip for spring action. Where weaker springs are desired, thinner strips can be used or openings between the secondary springs can be made wider in proportion to the secondary springs. It is a feature of the invention that a large number of secondary springs are used so that each individual secondary spring bends as a flat strip and is not stiffened by having a curved cross section such as would occur, when the spring strips were bent to cylindrical shape, if the secondary springs were of a substantial width in the direction of the circumference of the cylinder to which the strip is bent.

The preferred embodiment of the invention has been illustrated and described and the invention is defined in the appended claims.

I claim:

1. A spring assembly comprising a laterally extending annular disc spring means including a plurality of secondary springs rigidly connected at one end with one of the circumferential edges of the annular disc the secondary springs having their other ends connected with a support by connections that resist bending of the secondary springs, other spring means including a plurality of secondary springs each of which is rigidly connected at one end with the other circumferential edge of the annular disc and connected at its other end with a reference device that moves in a direction parallel to the axis of the disc 2. The spring assembly described in claim 1 characterized by the disc being a spring that dishes to provide the spring action, the secondary springs being angularly spaced around the disc and being part of a spring strip having openings therethrough that space the secondary springs from one another, the strip being continuous beyond at least one end of said openings and the continuous portion of the strip constituting a part of the rigid connections of the ends of the secondary springs to the structure to which they are connected.

3. The spring assembly described in claim 2 characterized by a solid ring constituting the support at the ends of the secondary springs remote from the disc.

4. The spring assembly described in claim 2 characterized by the secondary springs being parts of a spring strip having openings therethrough spaced from one another and terminating short of both edge portions of the strip.

5. The spring assembly described in claim 4 characterized by the openings being wider than the secondary springs and the strip being steel of a thickness of .002 to .050 inches.

6. The spring assembly described in claim 1 characterized by the secondary springs connected with both the inner and outer circumferential edges of the disc extending substantially parallel to the axis of the disc and the secondary springs at the outside circumferential edge of the disc extending in the opposite direction to the secondary springs that are connected with the inside circumferential edge.

7. The spring assembly described in claim 6 characterized by the ends of the secondary springs that are remote from the disc each being connected to a solid ring by a rigid connection, and one of said rings constituting part of the reference device with which the spring assembly is used.

8. The spring assembly described in claim 7 characterized by the secondary springs that are connected with each of the inner and outer circumferences of the disc being portions of a spring strip that are substantially cylindrical, the secondary springs being separated from one another by openings through the strips, but the edge portions of the strips beyond said openings being substantially continuous and comprising parts of the connection of the secondary strips to the rings.

9. The spring assembly described in claim 1 characterized by the secondary springs connected to each of the circumferential edges of the disc being a part of spring strips having openings therethrough which space the respective secondary springs from one another, said secondary springs being of such limited extent in the direction of the circumference of the strip that at least a part of the height of each secondary spring is of flat cross section.

10. The spring assembly described in claim 1 characterized by the secondary springs connected to each of the circumferential edges of the disc being a part of spring strips having openings therethrough which space the respective secondary springs from one another, the secondary springs being of greater circumferential width than the openings which separate the secondary springs.

11. The spring assembly described in claim 1 characterized by the disc having an elasticity correlated with the elasticity of the secondary springs whereby the bending resistance of the secondary springs causes dishing of said disc, changes in the amount of said dishing providing most of the spring action of the assembly.

UNITED STATES PATENT OFFICE
CERTIFICATE OF CORRECTION

Patent No. 3,563,527            Dated    February 16, 1971

Inventor(s)   Alfred Tillman

It is certified that error appears in the above-identified patent and that said Letters Patent are hereby corrected as shown below:

Column 2, line 15, cancel "17"; lines 72 and 74, after "disc", each occurrence, insert a comma.

Signed and sealed this 29th day of June 1971.

(SEAL)
Attest:

EDWARD M. FLETCHER, JR.            WILLIAM E. SCHUYLER,
Attesting Officer                 Commissioner of Paten